United States Patent [19]

Gerpheide et al.

[11] Patent Number: 4,975,830
[45] Date of Patent: Dec. 4, 1990

[54] COMPUTER COMMUNICATION SYSTEM HAVING SUPPLEMENTAL FORMATS

[75] Inventors: George E. Gerpheide, Salt Lake City; Kerry D. Sharp, Riverton; Daniel J. Lee, Salt Lake City; David C. Olsen, Kaysville; David B. Meyer; Mark E. Kohagen, both of Salt Lake City, all of Utah

[73] Assignee: Dayna Communications, Inc., Salt Lake City, Utah

[21] Appl. No.: 279,846

[22] Filed: Dec. 5, 1988

[51] Int. Cl.$^5$ ............................................. G06F 15/16
[52] U.S. Cl. ................................ 364/200; 364/228.3; 364/229; 364/229.1
[58] Field of Search ................................ 364/200, 900

[56] References Cited

U.S. PATENT DOCUMENTS 4,777,595 10/1988 Strecker et al. .................... 364/200

Primary Examiner—Raulfe B. Zache
Attorney, Agent, or Firm—Jon C. Christiansen; David R. Black

[57] ABSTRACT

A computer communication system including a comunication medium, a plurality of nodes coupled to the communication medium, and a transfer format selection means for selecting a format for the transfer of data between nodes. The system includes at least one default node and at least two supplemented nodes. Each node has a set of data transfer formats. A default format is included in the format set of each node. Each supplemented node has at least one supplemental format. Transfer format selection means in the form of circuitry and software provides for the selection of a data transfer format which is included in the source node format set and the destination node format set and is compatible with the communication medium. The source node includes a cache of node format sets. The source node searches for the destination node format set in the source node cache and selects a format which is common to the format sets of the source node and destination node. Our invention also includes an attention signal, a network interface and the other devices, apparatus, methods and subject matter disclosed herein.

45 Claims, 10 Drawing Sheets

T < IFG max time = 200 µs

COMPUTER COMMUNICATION SYSTEM HAVING SUPPLEMENTAL FORMATS

INTRODUCTION

This invention relates to computer communication systems within which a plurality of nodes communicate by transferring data to each other over a shared communication medium. As used herein, a "node" is a computer, file server, bridge, gateway, co-processor, modem server, memory, printer or other data processing device ("DPD") coupled to the communication medium through an interface. The communication medium can be cable, fiber optics, radio channel or other medium of data communication shared by the nodes.

An example of a communication system to which this invention is particularly well suited is a local area network. Local area networks and the technology related thereto are well known to persons of ordinary skill in the relevant art. An example of a local area network is the LocalTalk Network (also known as the AppleTalk Network) for Macintosh computers (e.g. Macintosh II, Macintosh SE and Macintosh Plus computers) manufactured by Apple Computer, Inc. of Cupertino, Calif. A description of this local area network is found in Inside AppleTalk, 1986, Gursharan S. Sidhu, Richard F. Andrews and Alan B. Openheimer, which is incorporated by reference herein. U.S. Pat. No. 4,661,902, "Local Area Network with Carrier Sense Collision Avoidance" and U.S. Pat. No. 4,689,786, "Local Area Network with Self Assigned Address Method" also provide description relevant to this local area network and are incorporated by reference herein.

SUMMARY OF INVENTION

A computer communication system is disclosed including a communication medium, a plurality of nodes coupled to the communication medium, and a transfer format selection means for selecting a format for the transfer of data between nodes (i.e. from source node to destination node). The system includes at least one default node and at least two supplemented nodes. Each node has a set of data transfer formats. A default format is included in the format set of each node (i.e. a default format is a format common to all format sets). Each supplemented node has at least one supplemental format (and in one form of this invention has at least two supplemental formats). A supplemental format is not common to every node. A format is defined in terms of data transmission characteristics. In one form of this invention, a format is defined in terms of data architecture.

Transfer format selection means in the form of circuitry and software provides for the selection of a data transfer format which is included in the source node format set and the destination node format set and is compatible with the communication medium. The source node includes a cache of node format sets. The source node searches for the destination node format set in the source node cache and selects a format which is common to the format sets of the source node and destination node.

Our invention also includes an attention signal, a network interface and the other devices, apparatus, methods and subject matter disclosed herein.

DETAILED DESCRIPTION OF INVENTION

Figure 1:
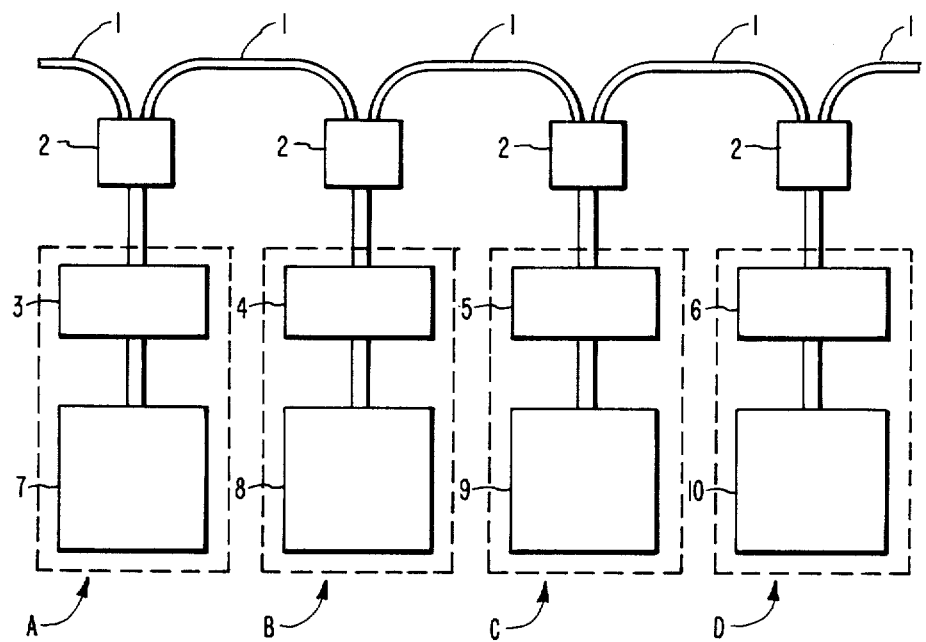
FIG. 1 depicts a local area network.

FIG. 1 illustrates a computer communication system in the form of a local area network (LAN). Cable 1 serves as the communication medium shared by nodes A, B, C and D. Cable 1 is a shielded, twisted pair cable and is driven in accordance with EIA standard RS-422 balanced voltage specifications. Cable 1 is terminated at each end with 100 Ohm resistors to eliminate signal reflection (not shown in FIG. 1). Nodes A, B, C and D include network interfaces 3, 4, 5 and 6 and data processing devices (e.g. computers, files servers, bridges, etc.) 7, 8, 9 and 10. Nodes A, B, C and D are coupled to cable 1 through connection modules 2 which, conventionally, include a passive coupling transformer and resistive and capacitive circuits. Network interfaces 3, 4, 5 and 6 are comprised of the circuitry necessary to establish and implement the interfaces. In the practice of the invention the coupling of nodes to the communication medium can be achieved through cable (as in FIG. 1), fiber optics, radio channel or any other means for the transfer of data between the nodes and communication medium.

Data is transferable from one node (the "source node") to another node (the "destination node") over the communication medium (e.g. cable 1). Typically, but not necessarily in every case, each node is capable of functioning as a source node (i.e. has the capability to transmit data) and as a destination node (i.e. has the capability to receive data).

Associated with each node is a set of data transfer formats. A set of data transfer formats is also associated with the communication medium. Format is defined in terms of the following data transmission characteristics: (1) data architecture and/or (2) the rate of data transmission. Data architecture can be defined by one or more of the following data transmission characteristics: encoding, encryption, compression and protocol.

Figure 2:
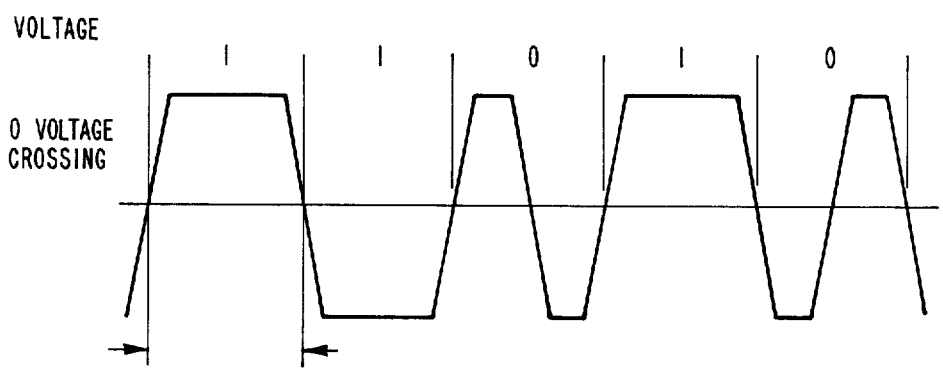
FIG. 2 depicts FM-0 encoding.
Figure 3:
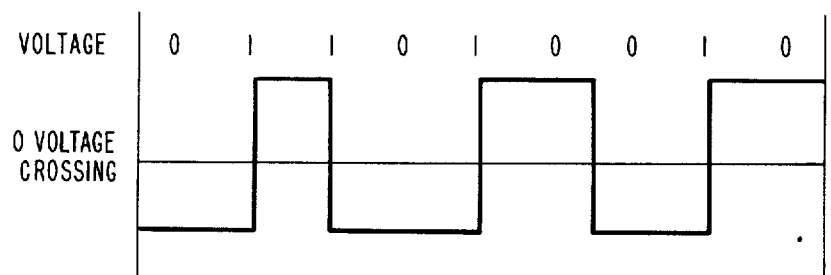
FIG. 3 depicts MFM encoding.

In general, encoding is the waveform pattern or other waveform representation of data bits used for transmission of data on the communication medium. An example of encoding is FM-0 encoding depicted in FIG. 2 and described below. Data bits are encoded using a self-clocking technique. A transition (i.e. a 0 voltage crossing) occurs at the end of each bit cell. Each bit cell provides timing information. An additional transition is added at mid-cell to represent or encode a zero. Another example of encoding is MFM encoding depicted in FIG. 3. Data bits are encoded using a self-clocking technique. A transition (i.e. a 0 voltage crossing) at mid-cell represents a "1". A zero is represented by the absence of a mid-cell transition. FM-0 and MFM encoding are well known to persons of ordinary skill in the art.

Data is encrypted by organizing or arranging the data in a nonintelligible form for transmission. When encrypted data is received, it is reorganized or rearranged into its original form. Encryption is used primarily for security reasons. Encryption is well known to persons of ordinary skill in the art.

Data is compressed by representing the data in a shorter form which requires fewer bits to represent the data. Compression facilitates data transmission and storage. Compression is well known to persons of ordinary skill in the art.

Protocol is the convention used for data transmission which defines frame organization and content including command codes for the protocol handler of the destination node. An example of protocol is the Link Access Protocol (LAP) described in the previously referenced publication *Inside AppleTalk*. Another example of protocol is the Dayna Link Access Protocol (DLAP). DLAP is similar to LAP except as follows: (1) a six byte auxiliary address follows the source and destination address bytes found in the LAP protocol packet, and (2) the data packet length of DLAP is 4,200 bytes.

Data architecture is defined by any combination of one or more of the four data transmission characteristics described above. For example, data architecture may be defined by encoding and protocol or by encoding alone.

The rate of data transmission is the rate at which data bits are transmitted from source node to destination node. In a typical LocalTalk Network the rate of data transmission is 230.4 kilobits per second.

The node format sets of nodes A, B, C and D each include a default format, i.e., the default format is common to each node format set. The format set of the communication medium also includes the default format. This default format ensures that all nodes will be able to communicate with each other. Although not preferred, more than one default format can be used in the practice of our invention.

In this example, nodes A and B are supplemented nodes. A supplemented node is a node having a format set which includes, in addition to the default format (or default formats), one or more additional formats, i.e., supplemental formats. In this example, nodes C and D are default nodes. Their format sets consist only of the default format (or default formats). Supplemental formats are not common to all of the nodes.

Default nodes (e.g. nodes C and D) can only communicate using the default format. Supplemented nodes (e.g. nodes A and B) can communicate with the default format and, as described below, with supplemental formats. A source node and destination node can communicate with a given supplemental format if that supplemental format is included in the format set of the source node, the format set of the destination node and the format set of the communication medium.

In this embodiment, the format set of each node is represented by a 32 bit word. Bit strings having less or more than 32 bit positions can also be used. Each bit position corresponds to a particular format. If a bit equals 1 (or true), the format set includes the format corresponding to the bit position. If the bit equals 0 (or false), the format set does not include the format corresponding to the bit position. Alternatively, each bit of the 32 bit word can represent a specific data transmission characteristic (e.g. FM-0 encoding) or a specific combination of data transmission characteristics (e.g. FM-0 encoding and LAP protocol) rather than an entire format. The format would then be defined by a plurality of bits. Many other representations of format sets are possible and, therefore, are intended to be within the scope of our invention.

In this example, each bit represents an entire format as follows:

| Bit Position | Node A | Node B | Node C | Node D |
|---|---|---|---|---|
| 1 (format 1) | 1 | 1 | 1 | 1 |
| 2 (format 2) | 1 | 1 | 0 | 0 |
| 3 (format 3) | 1 | 0 | 0 | 0 |
| 4 (format 4) | 0 | 0 | 0 | 0 |
| . | . | . | . | . |
| . | . | . | . | . |
| 32 (format 32) | 0 | 0 | 0 | 0 |

In this example, the node A format set has three formats, the node B format set has two formats and the node C and node D format sets have only one format. Format 1 is the default format and, in this example, is the well-known LocalTalk (previously AppleTalk LAP) format. Formats 2 and 3 are supplemental formats. In this example, a format is included in a node format set only if it is compatible with the communication medium, i.e., only if it is included in the communication medium format set. Formats 4 to 32 are not included in the format sets of nodes A, B, C and D. Formats 1, 2 and 3 are different, i.e., the data transmission characteristics defining the formats are different. Each node stores within its memory (or a memory to which it has access) the formats included in its format set. In this example, the formats are defined by data transmission rate and data architecture (with data architecture defined solely in terms of encoding and protocol) as follows:

| Format 1: | Rate = 230.4 kilobits per second<br>Encoding = FM-0<br>Protocol = LAP |
|---|---|
| Format 2: | Rate = 1,700 kilobits per second<br>Encoding = MFM<br>Protocol = DLAP |
| Format 3: | Rate = 850 kilobits per second<br>Encoding = FM-0<br>Protocol = LAP |

Node A can communicate with node B using format 1 or 2. Node A cannot use format 3 to communicate with node B because format 3 is not included in node B's format set.

Each node has a cache comprised of its own format set and the format sets of the other nodes on the network (i.e. coupled to the communication medium). In this embodiment of the invention, a format is not included in a node format set unless the format is compatible with the communication medium (i.e. included in the communication medium format set). This eliminates the need to include a communication medium format set in the cache of each node. In an alternative embodiment of our invention, the node cache includes an entry for the communication medium format set and inclusion of a format in a node format set is not subject to the above restriction that the format be compatible with the communication medium (Note, however, that the format selected for data transmission must be common to all three format sets, i.e., the source node, destination node and communication medium format sets).

It should be noted that the cache of any given node might not be complete, i.e., the cache might not include all of the node format sets. If a node format set is not included, an inquiry dialog must be initiated.

Figure 4:
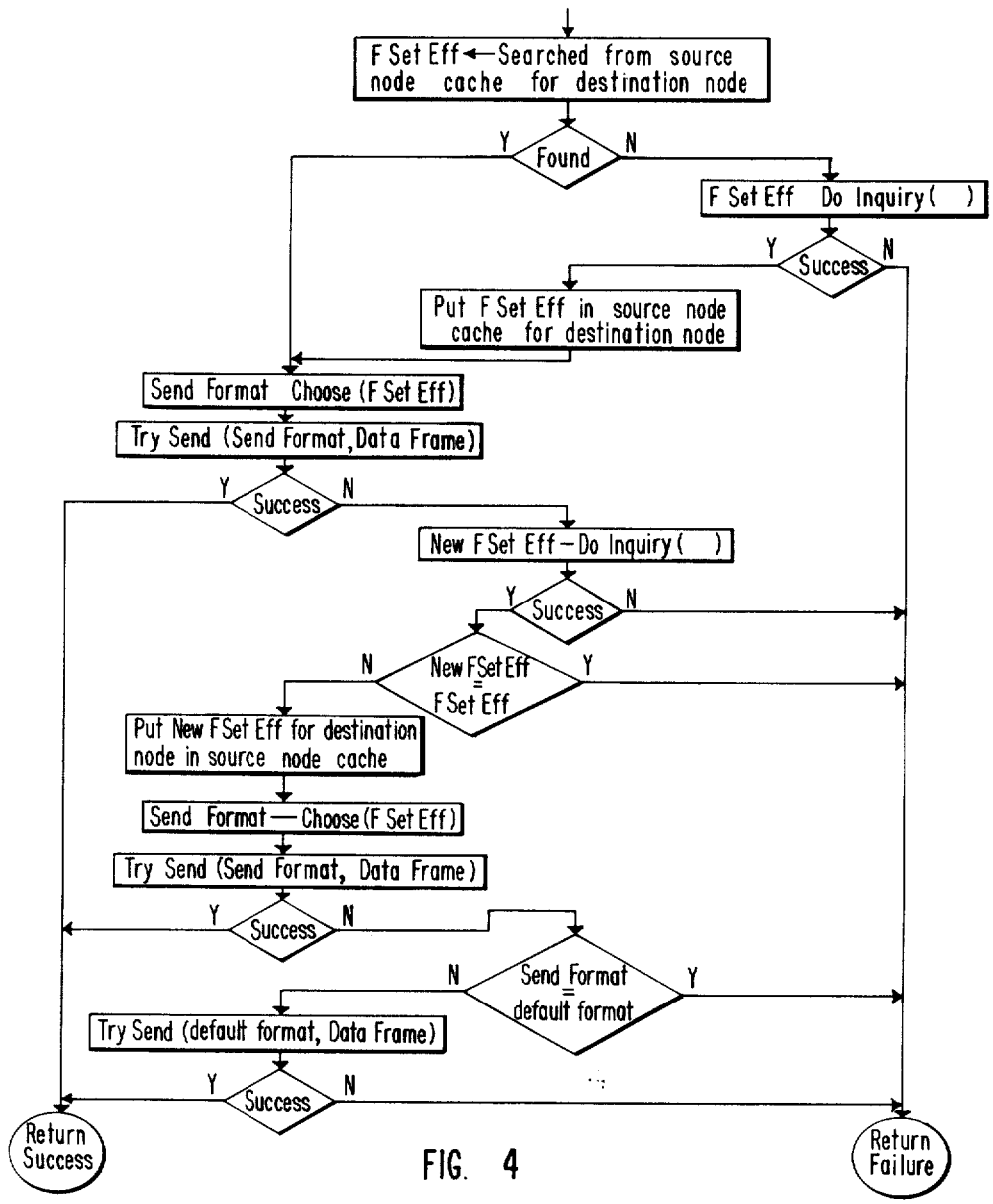
FIG. 4 depicts a flow chart of the logic used by a supplemented node to transmit data.

FIG. 4 depicts a flow chart of the logic used by a supplemented node to transmit data. The source node (e.g. node A) desires to transmit data to the destination node (e.g. node B). The source node searches for the destination node's format set (FSetEff) within the source node's cache. FSetEff for the destination node is a 32 bit word in this example. If FSetEff for the destination node is not found in the source node's cache, then the source node will perform an inquiry dialog with the destination node to learn FSetEff (see the DoInquiry flow chart of FIG. 6). If FSetEff for the destination node is found in the source node's cache, then a format (SendFormat) is chosen from among the available formats of the destination node's FSetEff. The available formats in the destination node's FSetEff are those formats which are common to (i.e. included in) the source node format set and the destination node format set. If there is more than one common format, then the node will select a format from among the common formats. This selection can be random or can be based upon a predetermined priority or can be based upon any criterion or criteria chosen by or for the user. The selection can be executed by the node's interface circuitry or software running on the node's DPD (if the DPD is a computer). For example, if the user requires that data be transmitted in an encrypted form, the source node would select a format having the desired encryption with the highest rate of data transfer available for the selected encryption. The data frame is transmitted from the source node to the destination node using the specified SendFormat (see the TrySend flow chart of FIG. 5).

Figure 5:
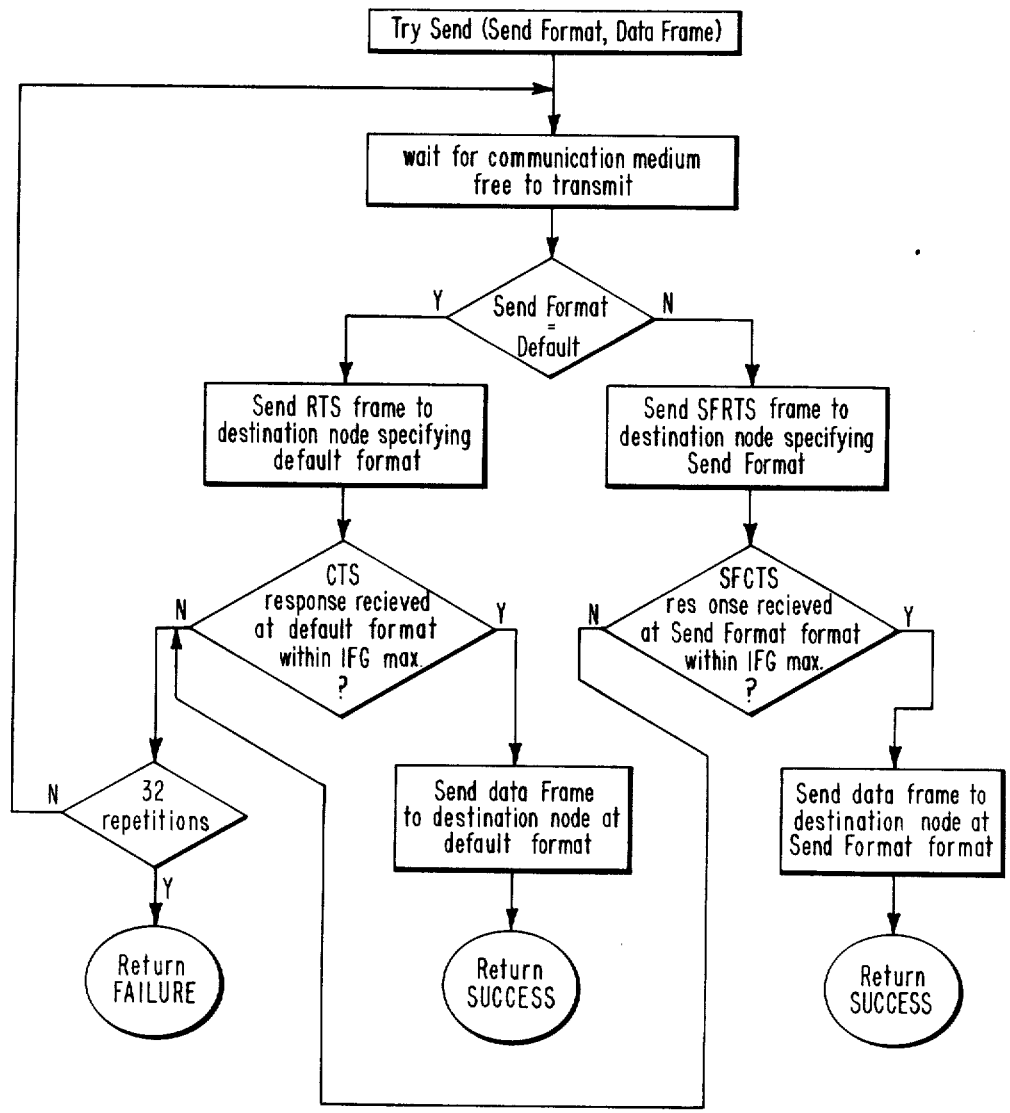
FIG. 5 depicts the TrySend flow chart.

With reference to FIG. 5, if SendFormat is the default format, then the source node transmits an RTS frame (Request to Send frame) to the destination node specifying the default format. If SendFormat is not the default format (i.e., is a supplemental format), then the source node transmits an SFRTS frame (Supplemental Format Request to Send frame) to the destination node specifying the SendFormat format. (The Receive Frame flow chart of FIG. 7(a) sets forth the logic governing the destination node in responding to receipt of RTS or SFRTS frames.) If a CTS frame is received by the source node from the destination node in response to the RTS frame, then the data frame is transmitted to the destination node using the default format. If an SFCTS frame is received by the source node from the destination node in response to the SFRTS frame, then the data frame is transmitted to the destination node using the SendFormat format.

Figure 6:
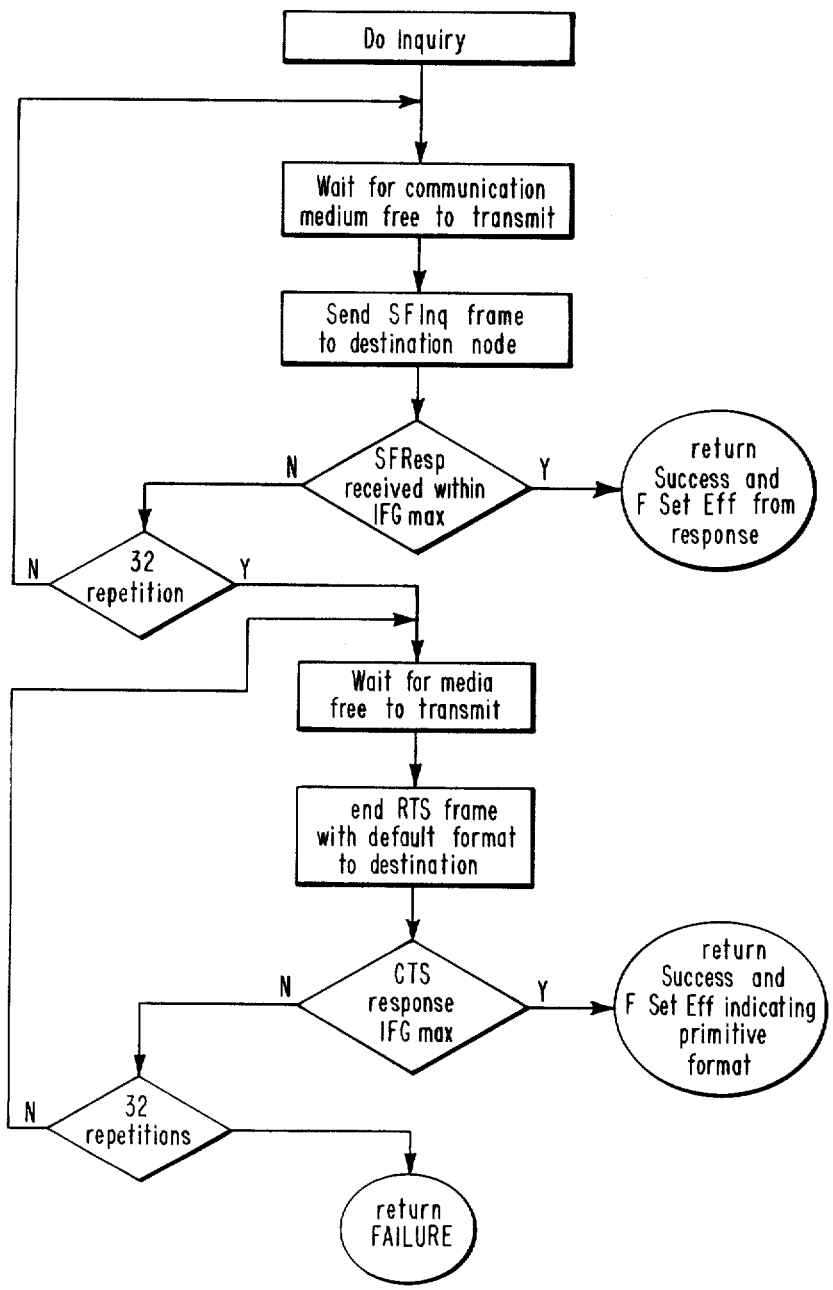
FIG. 6 depicts the DoInquiry flow chart.

The DoInquiry flow chart of FIG. 6 sets forth the logic followed when a search of the source node cache fails to produce FSetEff for a destination node. The source node transmits an SFInq frame (Supplement Format Inquiry frame) to the destination node. The SFInq frame will be sent in the default format to ensure that communication with the destination node is attempted with a format compatible with the destination node (i.e. with a format in the destination node's format set). (The Receive frame flow chart of FIG. 7(b) sets forth the logic governing the destination node in responding to the receipt of the SFInq frame). If an SFResp frame is received by the source node from the destination node in response to the SFInq frame then FSetEff is communicated to the source node and stored in its cache as the format set of the destination node.

Figure 7A:
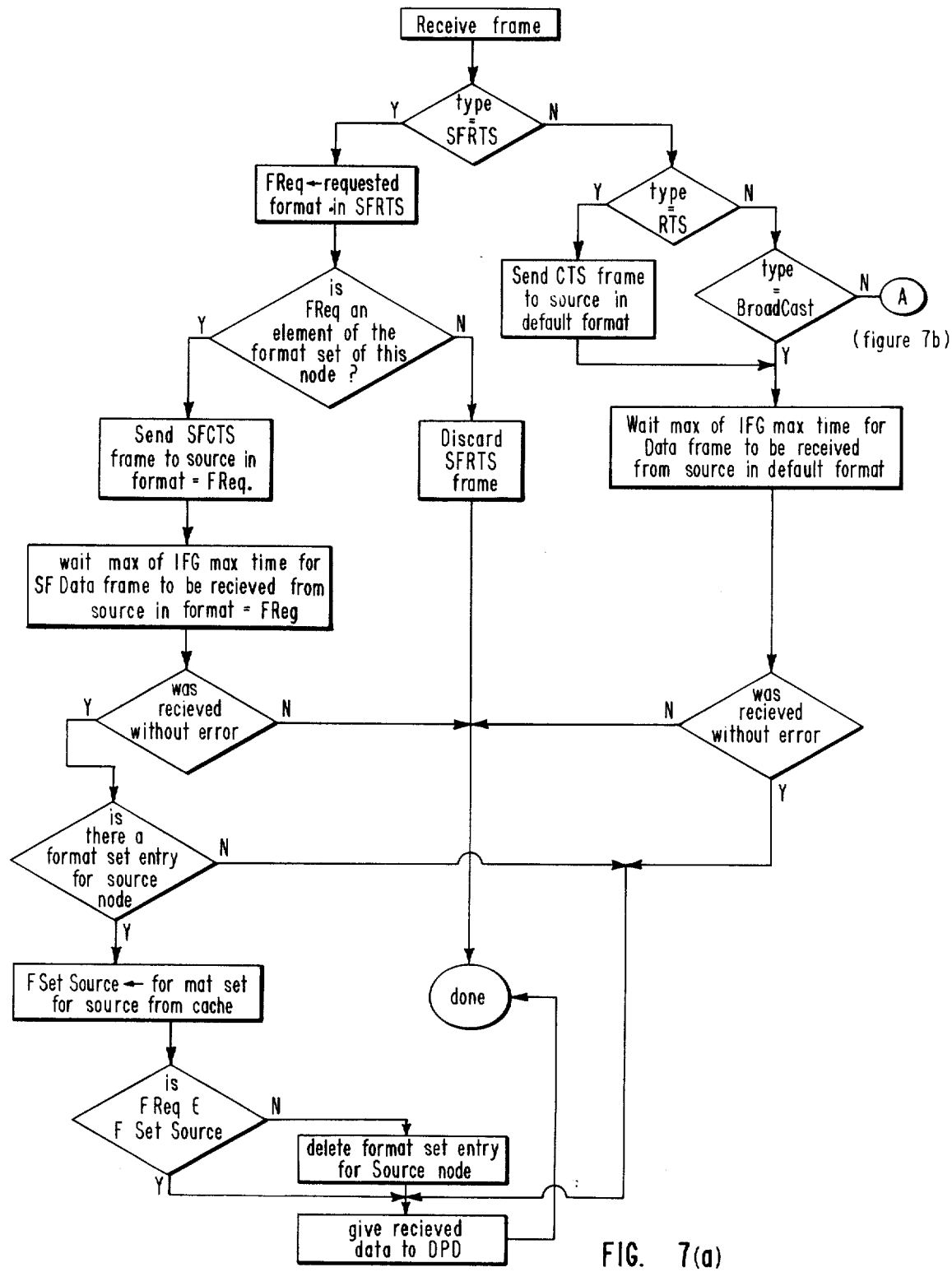
FIGS. 7(a) and 7(b) depict a flow chart of the logic used by a destination node to process frames received by it.
Figure 7B:
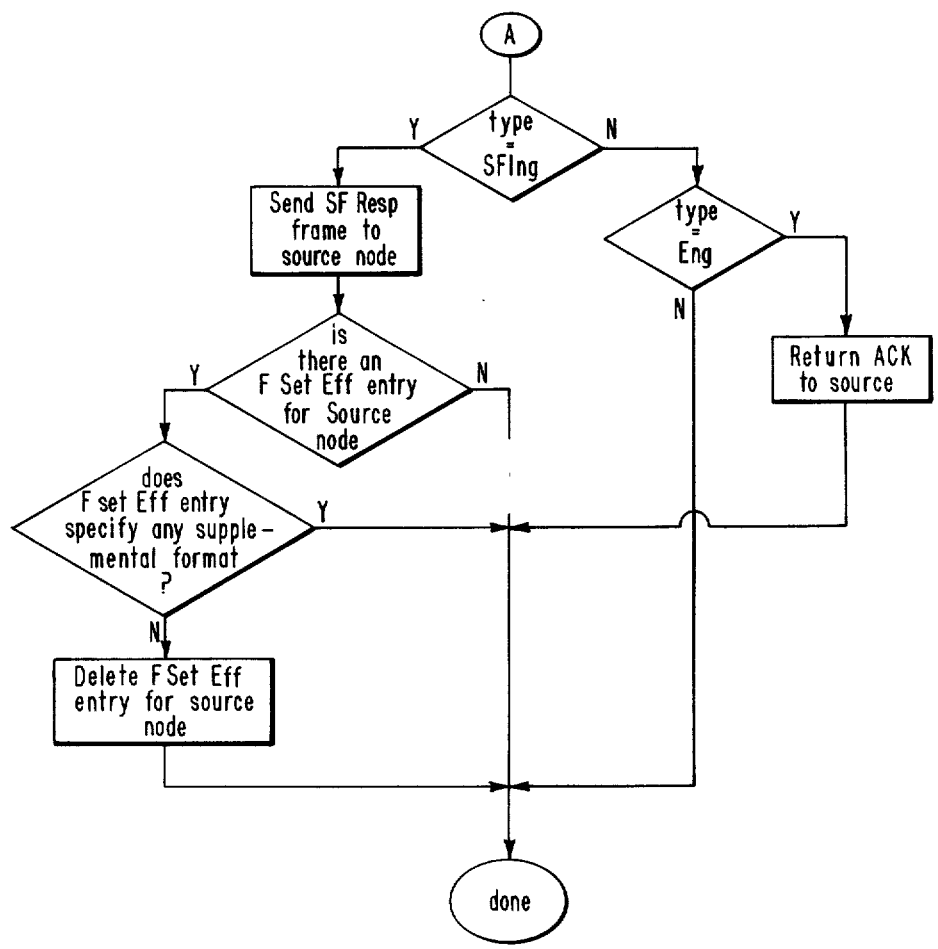

Frames received by a destination node are processed in accordance with the logic set forth in the flow chart of FIGS. 7(a) and 7(b). Note that FIG. 7(b) is a continuation of FIG. 7(a). When an SFRTS frame is received by the destination node, the variable FReq is assigned the format requested by the SFRTS frame. If the FReq format is an element of the destination node's format set, then an SFCTS frame is transmitted by the destination node to the source node. If an SFData frame is received by the destination node from the source node within IFGmax time without error, then the destination node will determine if there is a format set for the source node in the destination node's cache. If there is, then FSetSource will be assigned the value of the source node's format set as contained in the destination node's cache. If the FReq format is not an element of FSetSource (i.e. is not included in FSetSource) then the source node format set entry in the destination node's cache will be deleted as obsolete. The received data is passed to the data processing device of the node (e.g. computer, etc.). The processing of RTS frames and Broadcast frames is also depicted in FIG. 7(a) and is self-explanatory.

When an SFInq frame is received by the destination node from the source node (see FIG. 7(b)), the destination node transmits an SFResp frame to the source node. If there is a source node FSetEff entry in the destination node's cache and if that FSetEff entry does not include a supplemental format, then the FSetEff entry will be deleted from the destination node's cache as obsolete.

Figure 8:
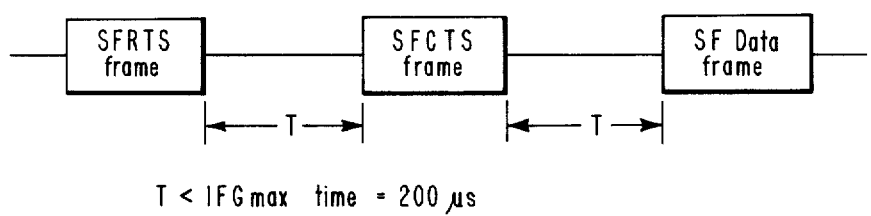
FIG. 8 depicts supplemental format dialog between a source node and destination node.

FIG. 8 depicts supplemental format dialog between a source node and a destination node. The source node transmits an SFRTS frame. Within a time T less than IFGmax, the destination node transmits an SFCTS frame to the source node. Within time T, the source node transmits an SFData frame to the destination node. The sequence is similar to the sequence of RTS, CTS and Data frames of the default LocalTalk format. Dialogs are separated by a minimum Inter-Dialog Gap (IDGmin). For LocalTalk the IDGmin equals 400 microseconds. Frames within a dialog are separated by a maximum Inter-Frame Gap (IFGmax). For LocalTalk the IFGmax=200 microseconds.

Figure 9:
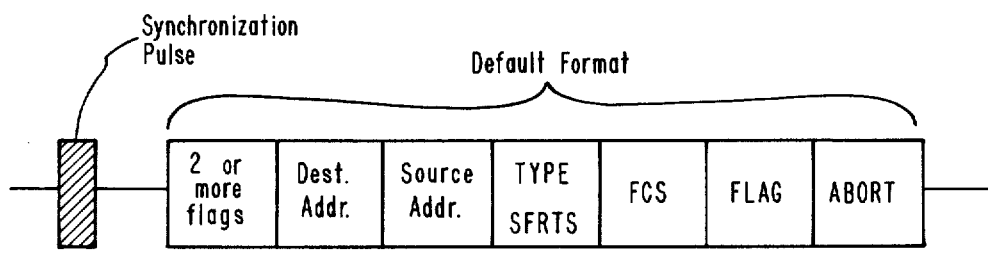
FIG. 9 depicts an SFRTS frame.

FIG. 9 depicts an example of an SFRTS frame. A synchronization pulse at least 1.5 bit times in length and an at least 1.5 bit times wait precede the SFRTS frame. The SFRTS frame is transmitted from a supplemented source node. A default source node will only transmit an RTS frame. The SFRTS frame is transmitted the using default format. The SFRTS frame, in this example, is organized as follows: two or more flags, destination node address, source node address, type field, FCS (frame check sequence), flag and abort. The SFRTS frame provides a "supplemental format signal" to the destination node. This signal can be encoded in the type field of the SFRTS frame. This signal specifies the format to be used in transmitting subsequent frames.

Figure 10:
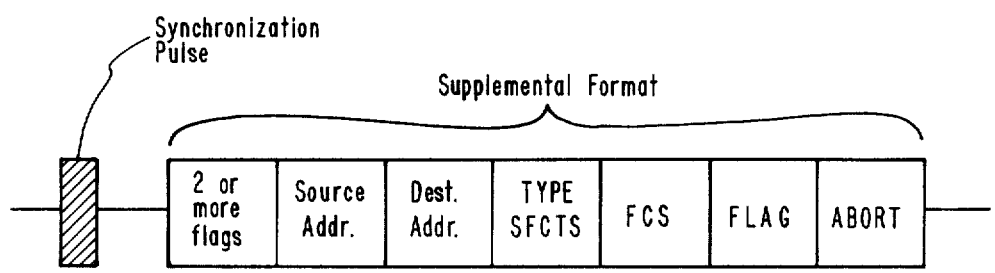
FIG. 10 depicts an SFCTS frame.

FIG. 10 depicts an SFCTS frame preceded by a synchronization pulse and a wait as described for the SFRTS frame. The SFCTS frame is transmitted from a supplemental destination node. A default destination node will only transmit a CTS frame. The SFCTS frame is transmitted using the supplemental format specified by th SFRTS frame. The SFCTS frame in this example is organized as follows: two or more flags, source node address, destination node address, type field, FCS, flag and abort.

Figure 11:
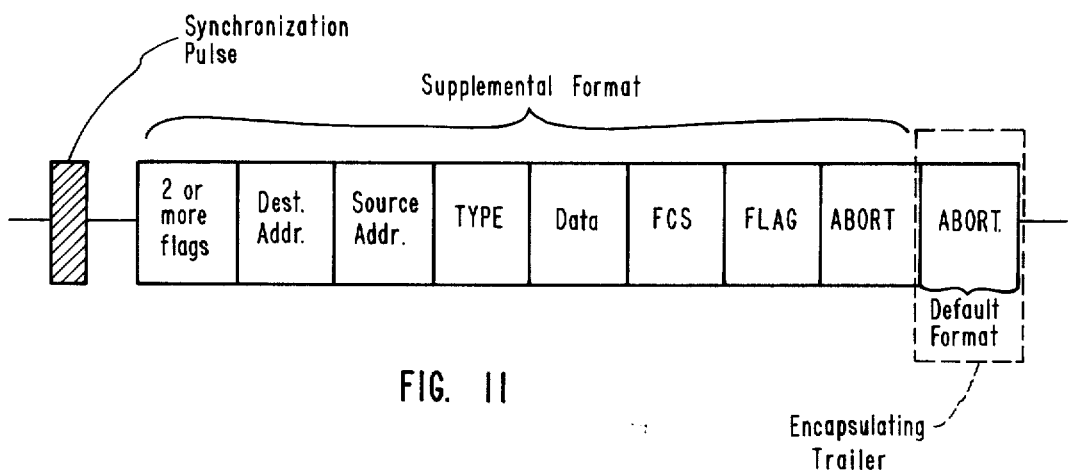
FIG. 11 depicts an SFData frame.

FIG. 11 depicts an example of an SFData frame (i.e. data in a supplemental format) preceded by a synchronization pulse and a wait as described for the SFRTS frame. The SFData frame is transmitted from a supplemented source node. A default node will only transmit data frames using a default format. The SFData frame is transmitted using the supplemental format specified by the SFRTS frame. The SFData frame, in this example, is organized as follows: two or more flags, destination node address, source node address, type field, data, FCS, flag and abort. A second abort in default format is included as a trailer to signal the end of the dialog.

Figure 12:
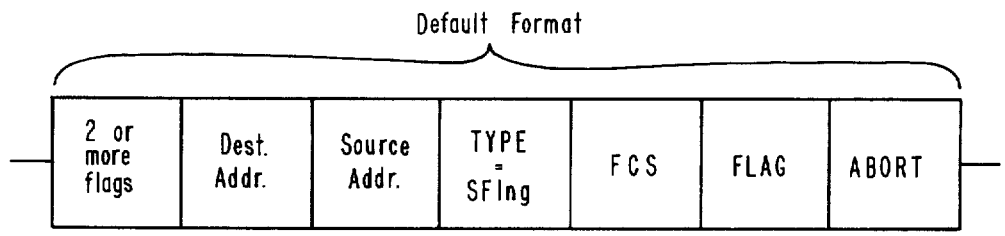
FIG. 12 depicts an SFInq frame.
Figure 13:
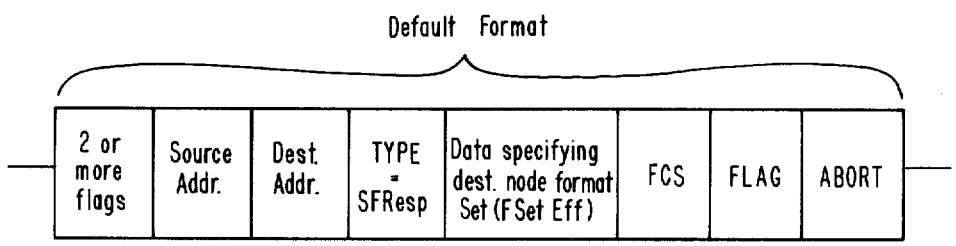
FIG. 13 depicts an SFResp frame.

FIGS. 12 and 13 depict an SFInq frame and an SFResp frame respectively. These frames are preceded by a synchronization pulse and a wait as described for the SFRTS frame. The SFInq frame is transmitted from a supplemented source node. The SFResp frame is transmitted from a supplemented destination node. These frames are transmitted using default format. The SFInq frame, in this example, is organized as follows: two or more flags, destination node address, source node address, type field, FCS, flag and abort. The type field indicates that the frame is an SFInq frame. The SFResp frame, in this example, is organized as follows: two or more flags, source node address, destination node address, type field, data, FCS, flag and abort. The type field indicates that it is an SFResp frame. The data field specifies the destination node format set FSetEff (and optionally the communication medium format set).

Default nodes may be unable to anticipate the existence of supplemental formats which are used by supplemented nodes. Default nodes only anticipate a default format. The network must ensure that network communication involving default nodes is not confused or disrupted by supplemented nodes using supplemental formats. For example, default nodes must not incorrectly interpret supplemental format communications as default format communications to them. Also, default nodes may use a "carrier sense" operation to determine when other nodes are using the communication medium. If a supplemented node is currently sending a supplemental format transmission, the default node may not recognize the transmission and attempt to begin another transmission while the supplemental format transmission is in progress. This will cause data corruption and may lead to network data errors. To solve this problem, and in accordance with one form of the invention, an attention signal is embedded into the waveform of data being transmitted in a supplemental format. Attention signals will be detected and recognized by the default nodes, i.e., the default nodes will not attempt to transmit data while attention signals are being transmitted. In this manner the default node will know not to transmit because the communication medium is occupied by a supplemental format transmission.

Figure 14:
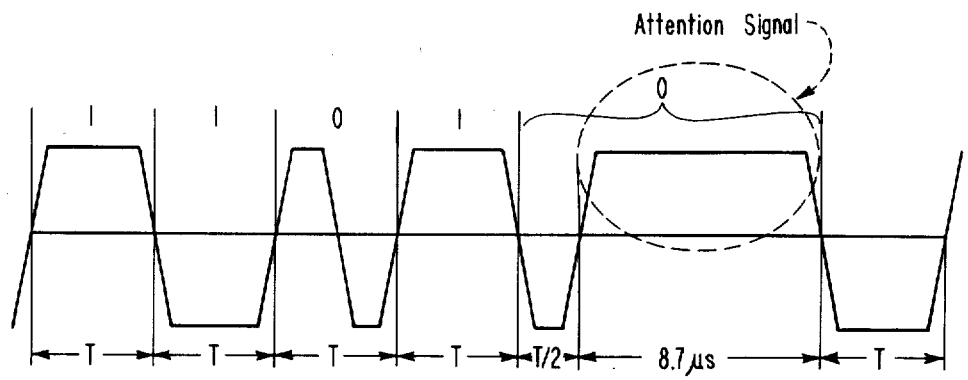
FIG. 14 depicts an Attention Signal (FM-0).

FIG. 14 depicts an attention signal embedded into the waveform of data being transmitted in a supplemental format (FM-0 encoding). In the example depicted in FIG. 14 the transmitted data is 110101 in FM-0 encoding. An attention signal is periodically inserted into the data waveform whenever data is driven onto the communication medium. In this example, the attention signal begins at the last half of a "0" bit cell (it could also occur during a "1" bit cell) and is created by holding the signal line in the same state, either high or low, for more than one bit-time T (preferably more than two bit-times). The signal line should be held in this state for a time greater than one-bit time (and preferably more than two bit-times) of the slowest data transmission rate used on the network (typically this will be the rate associated with the default format). Default nodes and other supplemented nodes monitor the communication medium and may miss detecting a "missing clock" (i.e. the held line signal) if the line signal is not held for at least this amount of time. In the example of FIG. 14, the attention signal is held at the high voltage state for more than 8.7 microseconds which is about twice the bit-time T of the data transmission rate corresponding to the LocalTalk format which in this example is the default format and has the slowest rate associated with it. In this example, no more than 350 microseconds of data are transmitted between attention signals because a minimum Inter-Dialogue Gap (IDGmin) of 400 microseconds is assumed. Preferably the spacing of attention signals is less than the IDGmin because this will ensure that the attention signal will be detected by the other nodes. A node will not transmit unless it monitors the communication medium for a period of time equal to (or greater than) its IDGmin without detecting the attention signal. The attention signal causes the SCC (serial communications controller) of the node (e.g. Zilog 8530 chip of a Macintosh computer) to report a missing clock, i.e., the absence of a transition (i.e. 0-voltage crossing) when normally expected between bit cells. Whenever a default node encounters an attention signal (e.g. missing clock) the default node will wait at least 400 microseconds (or whatever the IDGmin is) before attempting to transmit. If another attention signal is detected by the default node within the 400 microsecond period (i.e., the IDGmin period), the default node will again delay transmission for at least 400 microseconds. This process repeats itself until the attention signals cease which indicates cessation of the supplemental format transmission.

Figure 15:
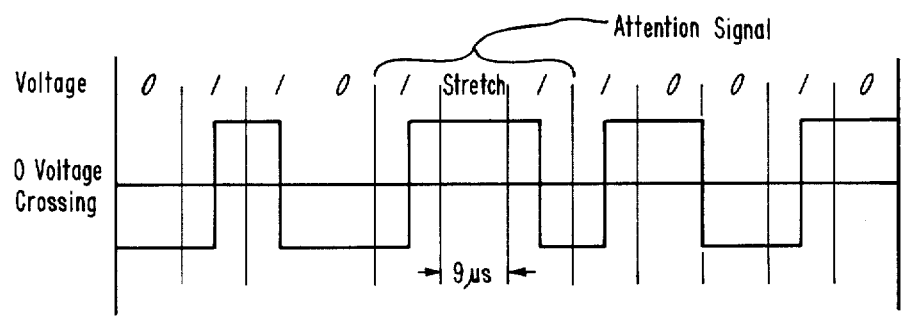
FIG. 15 depicts an Attention Signal (MFM).

FIG. 15 depicts another example of an attention signal embedded in a supplemental format transmission (MFM encoding). The attention signal is created by inserting a "1", holding the signal line for nine microseconds and then inserting another "1". The inserted "1's" and the stretched clock are stripped from the data by the destination node.

Clock stretch (i.e. the missing clock or held signal line creating an attention signal) is accomplished by causing a periodic pause in the transmission of data (i.e. periodically holding the signal line at a steady state). This can be done by using a timer to periodically stop the clock of the SCC chip of the source node, for example every 350 microseconds (or some other period of time less than the IDGmin). The clock is stopped for a period of time greater than two bit-times of the slowest data transmission rate used on the network. In the example of FIG. 14 the stop is a minimum of 8.7 microseconds. The clock is paused such that the destination node will detect the absence of a transition (i.e. 0-voltage crossing) when expected and will thereby be caused to also enter a hold state. This allows for resynchronization when data transmission is resumed (i.e. when the attention signal ends). The destination node is constructed such that if a transition is missing in the data stream the node will go into a hold state. In this state, the clock to the SCC chip of the destination node is stopped in a state that corresponds to the stopped state of the clock to the SCC chip of the source node. The destination node stays in this state until a transition is detected, at which time the destination node synchronizes to the transition and resumes receiving data. Synchronization can be achieved by using a phase locking circuit in the destination node.

The attention signal is preferably in the form of a missing clock (i.e. stretched clock) but any signal embedded in the supplemental format data can be used if it is detectable by the default nodes and recognizable by them as an attention signal. The attention signal is removed from the data by the destination node.

Our invention can be implemented in many different environments. Consider a conventional local area network of Macintosh computers. Assume that in FIG. 1 nodes A, B, C and D represent these Macintosh computers with interfaces 3, 4, 5 and 6 representing Local-Talk network interfaces which function as default interfaces. These Macintosh nodes (i.e. nodes A, B, C and D) are default nodes because conventionally each Macintosh node has only a single default format, i.e., the well known LocalTalk format (also known as the AppleTalk format). This format is defined by a data transmission rate of 230.4 kilobits per second, FM-0 encoding and LAP protocol. There is no encryption or compression in the format definition.

Figure 16:
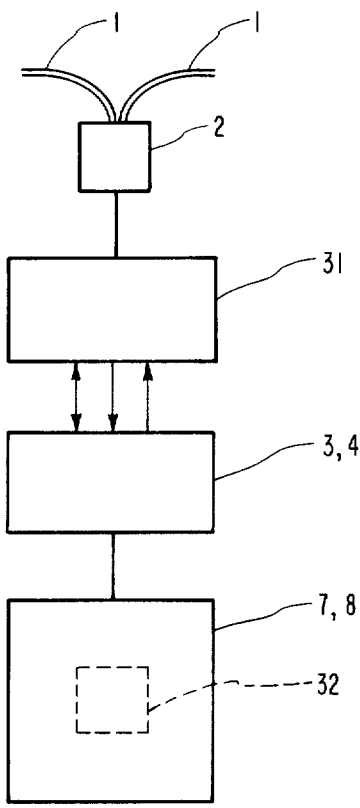
FIG. 16 depicts a Supplemental Network Interface for a Macintosh computer.

FIG. 16 represents a Macintosh computer 7 or 8 (as in FIG. 1) and a LocalTalk interface 3 or 4 (as in FIG. 1). The LocalTalk interface is a default interface. Supplemental interface circuitry 31 and supplemental interface software 32 are combined with computer 7 (or 8) and Local Talk interface 3 (or 4) to create a supplemented node. Serial data is communicated between the supplemental interface circuitry 31 and the default (LocalTalk) interface 3 (or 4). The supplemental interface circuitry 31 adjusts this data on transmission or reception to place it in the appropriate format. Circuitry 31 and software 32 form a network interface which supplements a default node to form a supplemented node by adding at least one supplemental format to the format set of the supplemented node (previously a default node). The network interface includes the supplemental format(s) and a means for selecting a data transfer format. The circuitry 31 and software 32 provide the supplemental format(s) and such format selection means.

Supplemental interface circuitry 31 interfaces with the network (represented by cable 1 and the other nodes coupled to cable 1) and with the Macintosh computer 7 (or 8). Supplemental interface circuitry 31 in this example is comprised of:

1. Transmitter clock generator. When the supplemented node is functioning as a source node the transmitter clock generator functions as a faster external clock for the SCC chip of the Macintosh computer (i.e. substitutes for the slower clock of the SCC chip). During the transmission of data, this clock is free running (except that attention signals are periodically created by stopping this clock for greater than 8.7 microseconds every 350 microseconds). During the reception of data the clock is phase-locked to the data received from the network. Use of this clock allows the default interface to operate at a higher data transmission rate than the rate dictated by the clock provided internally by Macintosh computer 7 (or 8).
2. Data separation circuitry. When the supplemented node is functioning as a destination node the data separation circuitry extracts the attention signal (e.g. stretched clock) from the data stream.
3. Attention signal generator.
4. Attention signal recognition and hold circuitry.
5. Circuitry to monitor cable 1 to detect transitions.
6. Command decoder to interpret commands sent from the Macintosh computer and supplemental interface software run on the Macintosh computer. These commands are sent over a command line running from the computer to the supplemental interface circuitry.
7. Busy signal generator to send a signal to the Macintosh computer to indicate when cable 1 is occupied by another transmission.

The node cache for storing the format set of this supplemented node and the format sets of other nodes reside in the memory of the Macintosh computer. Supplemental interface software creates and maintains the cache, selects formats, and controls operation of the supplemental interface circuitry. The supplemental interface software runs on the Macintosh computer 7 (or 8).

Nodes A and B of FIG. 1 can be altered by the addition of supplemental interface circuitry 31 and software 32 as described above and depicted in FIG. 16. Nodes A and B then become supplemented nodes.

Figure 17:
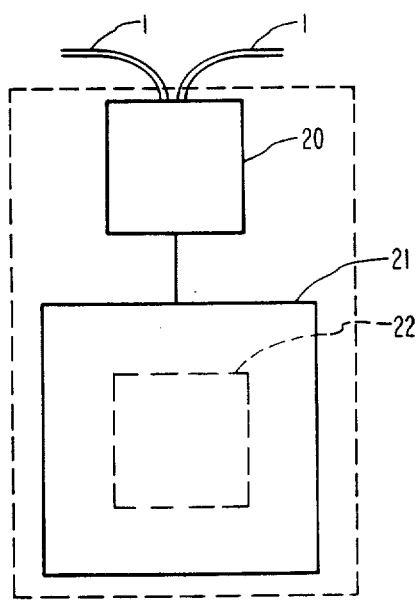
FIG. 17 depicts an Autonomous Supplemented Network Interface for an IBM PC/AT computer.

FIG. 17 represents an IBM PC/AT computer 21 which is coupled to cable 1 through connection module 20. Autonomous supplemental network interface circuitry 22 is added to computer 21. This circuitry can be embodied in the form of an adaptor card 22 plugged into the backplane of computer 21. Card 22 includes a serial port output to which connection module 20 is connected. Interface software for creating and maintaining a node cache, for selecting formats and for controlling the operation of the circuitry is part of the interface and runs on computer 21. Memory of computer 21 can be used as memory for the cache to store format set information. The interface circuitry and interface software execute the algorithms described earlier for transmitting and receiving data and provide the format selection means. The circuitry performs the functions of transmitter clock generation, data separation, attention signal generation, attention signal recognition and hold, cable monitoring, command decoder and busy signal generation similar to the supplemental interface 31 of FIG. 16. On command from computer 21 (or other DPD device in other embodiments) the interface circuitry accepts data to be transmitted from computer 21. The interface circuitry also accepts other commands from computer 20 such as the format to be used. This interface encodes data into a serial synchronous format for transmission on cable 1. During reception, the interface circuitry decodes data and provides it in a convenient form to computer 21. This autonomous supplemental network interface includes, in addition to the default format (i.e. LocalTalk format), at least one additional supplemental format. In an alternative embodiment of our invention the interface software can be in the form of firmware and the cache memory can be resident on the adaptor.

Nodes (in the form of IBM PC/AT computers) supplemented by supplemental interfaces including the circuitry and software of FIG. 17 and described above can be coupled to cable 1 as supplemented nodes.

For purposes of clarity and to avoid obscuring the essence of our invention with unnecessary and obvious detail, this disclosure does not include specific circuitry and computer programs for the implementation of the interface of FIGS. 16 or 17. Such circuitry and computer programs are well within the knowledge and skill of persons of ordinary skill in the art and means to accomplish the above-described functions and objectives are known in the art.

The foregoing description of our invention so fully reveals the general nature of the invention (including devices, apparatus and methods) that others can readily modify such invention and/or adapt it for various applications without departing from its generic concept, and, therefore such adaptations and modifications should be and are intended to be comprehended within the meaning and range of equivalents of the following claims, which claims define subject matter regarded by us to be our invention.

We claim:

1. A computer communication system for transferring data between a plurality of nodes comprising:
   (a) A communication medium,
   (b) a plurality of nodes coupled to said communication medium for a transfer of data between said nodes; wherein said transfer of data is a transfer of data from a source node selected from said nodes to a destination node selected from said nodes, and
   (c) transfer format selection means for selecting a format for the transfer of data from said source node to said destination node;
   wherein said plurality of nodes is comprised of at least one default node and at least two supplemented nodes;
   wherein each of said nodes has a format set comprised of one or more formats;
   wherein said formats are defined in terms of data architecture;
   wherein said data architecture is defined in terms of at least one member of a group consisting of encoding, encryption, compression and protocol;
   wherein each of said format sets includes at least one default format;
   wherein said at least one default format is included in the format sets of each of said nodes;
   wherein the format set of each of said supplemented nodes includes at least one supplemental format in addition to said at least one default format; and
   wherein said transfer format selection means is adapted to select a format which is common to the format sets of the source node and destination node and which is compatible with said communication medium.

2. A computer communication system in accordance with claim 1 wherein said transfer format selection means is comprised of a source node cache for node format sets and a destination node cache for node format sets; and wherein transfer format selection is made by the source node by searching for the destination node format set in said source node cache and by selecting a format which is included in said destination node format set and the source node format set.

3. A computer communication system in accordance with claim 2 wherein said transfer format selection means is further comprised of a means for the source node to conduct an inquiry dialog with the destination node if the search for the destination node format set in the source node cache does not locate the destination node format set; wherein said inquiry dialog is comprised of an inquiry signal transmitted by the source node to the destination node and a response signal from the destination node to the source node; and wherein said response signal includes the destination node format set as an entry for the source node cache.

4. A computer communication system in accordance with claim 2 wherein said communication medium has a communication medium format; wherein the formats in the format set of the source node are compatible with the communication medium format.

5. A computer communication system in accordance with claim 2 wherein said communication medium has a communication medium format set; wherein the source node cache includes an entry for the communication medium format set and wherein said transfer format selection means is adapted to select a format which is common to the format sets of the source node, destination node and communication medium.

6. A computer communication system in accordance with claim 2 wherein said format sets are represented by bit strings.

7. A computer communication system in accordance with claim 6 wherein bit positions of said bit strings represent formats.

8. A computer communication system in accordance with claim 6 wherein bit positions of said bit strings represent data transmission characteristics.

9. A computer communication system in accordance with claim 2 wherein said data architecture is defined by encoding and protocol.

10. A computer communication system in accordance with claim 2 wherein each of said supplemented nodes is adapted to transmit attention signals to said communication medium during a transmission of a supplemental format transmission by said supplemented node; and wherein said attention signals indicate to the other nodes coupled to said communication medium that a supplemental format transmission is in progress.

11. A communication system in accordance with claim 10 wherein said attention signals are embedded in said supplemental format transmission.

12. A communication system in accordance with claim 11 wherein data transmission rates, including a slowest data transmission rate, can be used on the communication system; wherein said supplemental format transmission is comprised of a signal line and wherein said attention signals are embedded in said supplemental format transmission by periodically holding the signal line of said supplemental format transmission in a same state for more than one bit time of the slowest data transmission rate used on the communication system.

13. A computer communication system in accordance with claim 1 wherein said communication medium and said nodes form a local area network.

14. A computer communication system in accordance with claim 2 wherein said communication medium and said nodes form a local area network.

15. A network interface for interfacing with a network having nodes and for supplementing the nodes of the network, said network interface comprising:
   (a) at least one supplemental format, and
   (b) transfer format selection means for selecting a format for the transfer of data from a source node to a destination node;

wherein said network is comprised of a communication medium and a plurality of nodes coupled to said communication medium for the transfer of data between nodes;
wherein said transfer of data is a transfer of data from a source node selected from said nodes to a destination node selected from said nodes;
wherein each of said nodes has a format set comprised of at least one default format common to each format set;
wherein said network interface is adapted to supplement a node selected from said nodes by adding said at least one supplemental format to the format set of said selected node;
wherein said transfer format selection means is adapted to select a format which is common to the format sets of the source node and destination node and which is compatible with said communication medium; and
wherein said formats are defined in terms of data architecture; wherein said data architecture is defined in terms of at least one member of the group consisting of encoding, encryption, compression and protocol.

16. A network interface in accordance with claim 15 wherein said transfer format selection means is comprised of a source node cache for node format sets; and wherein transfer format selection is made by the source node by searching for the destination node format set in said source node cache and by selecting a format which is included in said destination node format set and the source node format set.

17. A network interface in accordance with claim 16 wherein said format sets are represented by bit strings.

18. A network interface in accordance with claim 17 wherein bit positions of said bit strings represent formats.

19. A network interface in accordance with claim 17 wherein bit positions of said bit strings represent data transmission characteristics.

20. A computer communication system for transferring data between a plurality of nodes comprising:
(a) a communication medium,
(b) a plurality of nodes coupled to said communication medium for a transfer of data between said nodes; wherein said transfer of data is a transfer of data from a source node selected from said nodes to a destination node selected from said nodes, and
(c) transfer format selection means for selecting a format for the transfer of data from said source node to said destination node;
wherein said plurality of nodes is comprised of at least one default node and at least two supplemented nodes;
wherein each of said nodes has a format set comprised of one or more formats;
wherein each of said format sets includes at least one default format;
wherein said at least one default format is included in the format sets of each of said nodes;
wherein the format set of each of said supplemented nodes includes at least two supplemental formats in addition to said at least one default format; and
wherein said transfer format selection means is adapted to select a format which is common to the format sets of the source node and destination node and which is compatible with said communication medium.

21. A computer communication system in accordance with claim 20 wherein said transfer format selection means is comprised of a source node cache for node format sets and a destination node cache for node format sets; and wherein transfer format selection is made by the source node by searching for the destination node format set in said source node cache and by selecting a format which is included in said destination node format set and the source node format set.

22. A computer communication system in accordance with claim 21 wherein said transfer format selection means is further comprised of a means for the source node to conduct an inquiry dialogue with the destination node if a search for the destination node format set in the source node cache does not locate the destination node format set; wherein said inquiry dialogue is comprised of an inquiry signal transmitted by the source node to the destination node and a response signal from the destination node to the source node; and wherein said response signal includes the destination node format set as an entry for the source node cache.

23. A computer communication system in accordance with claim 21 wherein said communication medium has a communication medium format; and wherein the formats in the format set of the source node are compatible with the communication medium format.

24. A computer communication system in accordance with claim 21 wherein said communication medium has a communication medium format set; wherein the source node cache includes an entry for the communication medium format set and wherein said transfer format selection means is adapted to select a format which is common to the format sets of the source node, destination node and communication medium.

25. A computer communication system in accordance with claim 21 wherein said format sets are represented by bit strings.

26. A computer communication system in accordance with claim 25 wherein bit positions of said bit strings represent formats.

27. A computer communication system in accordance with claim 25 wherein bit positions of said bit strings represent data transmission characteristics.

28. A computer communication system in accordance with claim 21 wherein each of said supplemented nodes is adapted to transmit attention signals to said communication medium during a transmission of a supplemental format transmission by said supplemented node; and wherein said attention signals indicate to the other nodes coupled to said communication medium that a supplemental format transmission is in progress.

29. A computer communication system in accordance with claim 28 wherein said attention signals are embedded in said supplemental format transmission.

30. A computer communication system in accordance with claim 29 wherein data transmission rates, including a slowest data transmission rate, can be used on the communication system; wherein said supplemental format transmission is comprised of a signal line and wherein said attention signals are embedded into said supplemental format transmission by periodically holding the signal line of said supplemental format transmission in a same state for more than one bit time of the slowest data transmission rate used on the communication system.

31. A computer communication system in accordance with claim 30 wherein spacing between attention signals is less than a minimum Inter-Dialogue Gap used on the communication system.

32. A computer communication system in accordance with claim 21 wherein said communication medium and said nodes form a local area network.

33. A computer communication system for transferring data between a plurality of nodes comprising:
   (a) a communication medium
   (b) a plurality of nodes coupled to said communication medium for a transfer of data between said nodes; wherein said transfer of data is a transfer of data from a source node selected from said nodes to a destination node selected from said nodes and
   (c) transfer format selection means for selecting a format for the transfer of data from said source node to said destination node;
   wherein said plurality of nodes is comprised of at least one default node and at least two supplemented nodes;
   wherein each of said nodes has a format set comprised of one or more formats;
   wherein each of said format sets includes at least one default format;
   wherein said at least one default format is included in the format sets of each of said nodes;
   wherein the format set of each of said supplemented nodes includes at least one supplemental format in addition to said at least one default format;
   wherein said transfer format selection means is adapted to select a format which is common to the format sets of the source node and destination node and which is compatible with said communication medium; and
   wherein each of said supplemented nodes is adapted to transmit attention signals to said communication medium during transmission by it of a supplemental format transmission; and wherein said attention signals indicate to the other nodes coupled to said communication medium that a supplemental format transmission is in progress.

34. A communication system in accordance with claim 33 wherein said attention signals are embedded in said supplemental format transmission.

35. A communication system in accordance with claim 34 wherein data transmission rates, including a slowest data transmission rate, can be used on the communication system; wherein said attention signals are embedded into said supplemental format transmission by periodically holding a signal line of said supplemental format transmission in a same state for more than one bit time of the slowest data transmission rate used on the communication system.

36. A computer communication system in accordance with claim 35 wherein spacing between attention signals is less than a minimum Inter-Dialogue Gap used on the communication system.

37. A computer communication system in accordance with claim 33 wherein said transfer format selection means is comprised of a source node cache for node format sets and a destination node cache for node format sets; and wherein transfer format selection is made by the source node by searching for the destination node format set in said source node cache and by selecting a format which is included in said destination node format set and the source node format set.

38. A computer communication system in accordance with claim 37 wherein said transfer format selection means is further comprised of a means for the source node to conduct an inquiry dialogue with the destination node if a search for the destination node format set in the source node cache does not locate the destination node format set; wherein said inquiry dialogue is comprised of an inquiry signal transmitted by the source node to the destination node and a response signal from the destination node to the source node; and wherein said response signal includes the destination node format set as an entry for the source node cache.

39. A computer communication system in accordance with claim 37 wherein the one or more formats in the format set of the source node are compatible with a communication medium format of the communication medium.

40. A computer communication system in accordance with claim 37 wherein the source node cache includes an entry for the communication medium format set and wherein said transfer format selection means is adapted to select a format which is common to the format sets of the source node, destination node and communication medium.

41. A computer communication system in accordance with claim 33 wherein said communication medium and said nodes form a local area network.

42. A computer communication system in accordance with claim 36 wherein said communication medium and said nodes form a local area network.

43. In a computer communication system comprising a communication medium and a plurality of nodes coupled to said communication medium, a method for transferring data from a source node selected from said nodes to a destination node selected from said nodes comprising transmitting attention signals from said source node to said communication medium during transmission of said data; wherein said data is in a supplemental format; and wherein said attention signals indicate to the other nodes coupled to said communication medium that a supplemental format transmission is in progress.

44. A method in accordance with claims 43 wherein said attention signals are embedded in said supplemental format transmission.

45. A method in accordance with claim 44 wherein said communication system has a slowest data transmission rate; wherein said supplemental format transmission is comprised of a signal line; and wherein said attention signals are embedded into said supplemental format transmission by periodically holding the signal line of said supplemental format transmission in a same state for more than one bit time of the slowest data transmission rate used on the communication system.

* * * * *